358-84. OR 3,716,654 SR

United States Patent [19]

Hendrickson et al.

[11] 3,716,654

[45] Feb. 13, 1973

[54] REAL TIME REMOTE USE METERING FOR BROADCAST RECEIVERS

[75] Inventors: Melvin C. Hendrickson, Elmhurst, Richard G. Merrell, Westmont, Wilbert Parisoe, Highland Park, all of Ill.

[73] Assignee: Zenith Radio Corporation, Chicago, Ill.

[22] Filed: June 30, 1971

[21] Appl. No.: 158,413

[52] U.S. Cl. ....................178/5.1, 325/31

[51] Int. Cl. ....................H04n 1/44, H04b 1/00

[58] Field of Search ....................178/5.1; 325/31

[56] References Cited

UNITED STATES PATENTS

| | | | |
|---|---|---|---|
| 3,396,232 | 8/1968 | Hendrickson et al. | 325/31 |
| 3,058,065 | 10/1962 | Freeman et al | 178/5.1 |
| 3,244,806 | 4/1966 | Morris | 178/5.1 |

*Primary Examiner*—Benjamin A. Borchelt
*Assistant Examiner*—S. C. Buczinski
*Attorney*—John J. Pederson

[57] ABSTRACT

A system is disclosed for providing real time remote use metering of the receivers in an over-the-air pay TV system of the type in which a characteristic of the composite video signal is varied between different conditions from time to time in accordance with a predetermined code schedule and in which a composite code signal having a plurality of components whose permutation varies in relation to the code schedule is broadcast from a transmitter associated with a central office to all receivers in the system concurrently with the coded composite video signal, and in which there are a multiplicity of code-signal component permutations for each composite video signal condition. Associated with each receiver in the system is a decoder responding to the composite code signal to decode the coded composite video signal, and each of the decoders has a permutation device responsive to a different permutation of the code signal components to develop a predetermined response signal. A common return link links all of the receivers in the system to the central office. The transmitter sends different ones of the multiplicity of code signal component permutations upon different recurrences of a given composite video signal code condition so that response signals are sequentially developed by those of the decoder permutation devices which are in current use. The response signals are then returned to the central office by the common return link. The response signals are returned in time sequence correlated with that of the different code signal component permutations sent by the transmitter. The system also includes provision for remotely disabling any selected decoder from the central station.

24 Claims, 7 Drawing Figures

T502 R

Inventors
Melvin C. Hendrickson
Richard G. Merrell
Wilbert Parisoe
By
Attorney

REAL TIME REMOTE USE METERING FOR BROADCAST RECEIVERS

BACKGROUND OF THE INVENTION

The present invention relates generally to use metering of the receivers in a pay TV system and more particularly to remote use metering of the receivers on a real time basis.

The present invention also relates generally to the disabling of a selected decoder in a pay TV system and more particularly, to the remote disabling of a selected decoder in the system.

Arrangements have been developed for remote use metering of subscription television receivers in a system to permit an equitable assessment of charges to each subscriber based on the subscription programs actually viewed. Unfortunately, most of those prior arrangements require relatively complex, and consequently expensive circuitry and equipment in order to achieve accurate remote use metering. On the other hand, there are other remote systems that are not quite so complicated and costly but they have proven to be most unreliable in that they do not correctly determine the specific receivers that have been adjusted to view or utilize each subscription television program. This shortcoming particularly plagues remote use metering systems of the type in which the receivers are examined at the same time and reply to the central office in time sequence by means of synchronously operated transponders at the receivers. It has been difficult in prior systems to insure that the receivers always reply in the correct sequence.

It is therefore an object of the present invention to provide a new and improved remote use metering system for subscription television receivers which not only is relatively inexpensive but provides accurate and reliable results.

It is more particularly an object of the present invention to provide a new and improved remote use metering system which examines each receiver individually and receives back from each receiver the use metering responses on a real time basis.

It is also an object of the present invention to provide a new and improved subscription television receiver having means for receiving and responding to remote use metering examination on a real time basis.

In any pay TV system, it is to be expected that there may be instances in which a subscriber fails to pay his bill. In a cable TV system, the delinquent subscriber can be disconnected from the service, but in a broadcast system it is necessary to physically remove the pay TV receiver on the decoder from the possession of the subscriber. It would be highly desirable to have a disabling system which may be used to disable a selected receiver remotely, i.e., by a central station operation, in such a way that it cannot be made operative unless a service call is made. Of course, this service call would not be made until the subscriber has paid his bill.

It is therefore another object of the invention to provide a system for remotely disabling a selected pay TV receiver.

It is still another object of the invention to provide a method for remotely disabling a selected receiver in an over-the-air pay TV system.

It is still a further object of the invention to provide a receiver which may be remotely disabled.

SUMMARY OF THE INVENTION

The invention provides a system for real time remote use metering of the receivers in an over-the-air pay TV system of the type in which a characteristic of the composite video signal is varied between different conditions from time to time in accordance with a predetermined code schedule and in which a composite code signal having a plurality of components whose permutation varies in relation to the code schedule is broadcast from a transmitter associated with a central office to all receivers in the system concurrently with the coded composite video signal, and in which there are a multiplicity of code signal component permutations for each composite video signal condition. The system comprises a plurality of decoders, one associated with each receiver, for responding to the composite code signal to decode the coded composite video signal, each of the decoders comprising a permutation device responsive to a different permutation of the code signal components to develop a predetermined response signal. A common return link connects all of the receivers to the central office. The transmitter includes means causing it to send different ones of the multiplicity of code signal component permutations upon different recurrences of a given composite video signal code condition, whereby response signals are sequentially developed by those of the decoder permutation devices which are in current use. The system further comprises means coupling all of the decoder permutation devices to the common return link to return to the central office response signals from all operating decoders in time sequence correlated with that of the different code signal component permutations sent by the transmitter.

The present invention also provides a system for remotely disabling a selected decoder in an over-the-air pay TV system of the type in which a characteristic of the composite video signal is varied from time to time in accordance with a predetermined code schedule and in which a composite code signal having a plurality of components whose permutation varies in relation to the code schedule is broadcast from a transmitter associated with a central office to all receivers in the system concurrently with the composite video signal, and in which there are a multiplicity of code signal permutations for each composite video signal condition, and in which there is a decoder associated with each receiver which respond to the composite code signal to decode the coded composite video signal. The system comprises a plurality of permutation devices, one associated with each decoder, and each responsive to a different permutation of the code signal components to develop a predetermined response signal. Means are provided for causing the transmitter to send a code signal component permutation corresponding to the permutation device of the selected decoder to be disabled whereby response signals are developed by the permutation device. A means is coupled to each permutation device for responding to the response signals from the permutation device in a predetermined manner to establish a first predetermined condition. A common return link is provided from all of the decoders to the central office. There is provided means coupling all of the decoder permutation devices to the common return link, and means at the central office for establishing a second predetermined condition in the common return link. Associated with each decoder and coupled to the common return link are disabling means responsive to establishment of the first and second predetermined conditions for disabling the decoder.

BRIEF DESCRIPTION OF THE DRAWINGS

The features of the present invention which are believed to be novel are set forth with particularity in the appended claims. The invention, together with further objects and advantages thereof, may best be understood by reference to the following description in conjunction with the accompanying drawings and in which:

Figure 1:
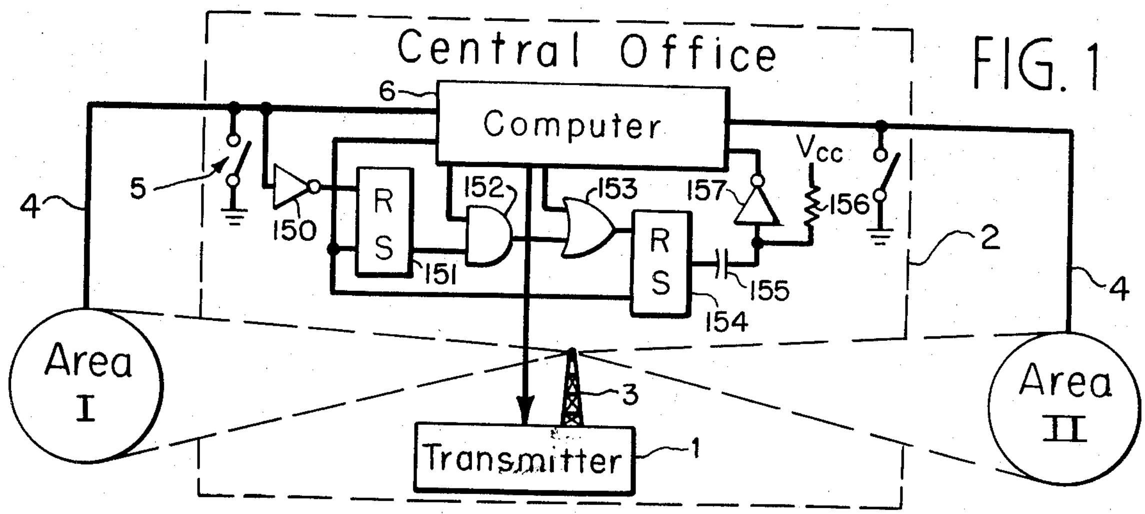
FIG. 1 is a block diagram of an over-the-air pay TV system embodying the present invention.

A subscription television transmitter for producing a coded television signal of the type to be utilized by a receiver embodying the present invention is shown in detail in U.S. Pat. No. 3,244,806, issued Apr. 5, 1966, in the name of George V. Morris, and assigned to the present assignee. Reference is made to the Morris patent for details of the transmitter. Very briefly, in the transmitter the video signal is coded by switching it at random between one operating mode, in which the video signal is delayed with respect to synchronizing signals, and another mode wherein the video signal is translated normally or without delay. The mode changes are made in response to the amplitude variations of a rectangular shaped coding signal developed by mode-determining circuitry, and therefore the mode changes are determined in part by the particular instantaneous adjustment of an adjustable switching apparatus. That apparatus serves to permutably apply a series of random code signal components to a plurality of input circuits of the mode determining circuitry to effect random actuation thereof. A different condition of adjustment preferably is employed for each subscription telecast or program.

The receiver operates in a complementary fashion in order to decode the coded video signal produced and transmitted by the transmitter. In other words, a similar mode-determining circuit and switching apparatus, which must be adjusted to the same setting as the switching apparatus at the transmitter, operates in response to the same random code signal components to develop a decoding signal having a wave shape identical to that of the coding signal. The decoding signal is then employed to delay those time intervals or segments of video information which were not delayed at the transmitter, while permitting the delayed intervals of the video signal to be translated to the receiver video channel without introducing any delay, thereby to achieve decoding.

The random code signal components, developed in the transmitter and employed to code the video signal, take the form of signal bursts occuring during vertical retrace intervals and exhibiting at random any one of three or four different frequencies selected from a group of six frequencies designated $F_1$ through $F_6$. The remaining frequencies of the group are used for deenergizing each decoder after each program and correlation testing, a concept not necessary to the understanding of the present invention; correlation testing is described and claimed in U.S. Pat. No. 3,011,016 issued Nov. 28, 1961 to Erwin M. Roschke and assigned to the present assignee. In order to control the decoding apparatus at the receiver, the code signal burst as well as the correlation signal burst are added to the composite video signal in the transmitter during the vertical-retrace intervals. Separating, filtering and rectifying circuitry produce rectified signal bursts of frequencies $F_1$ through $F_6$. The rectified signal bursts of frequencies $F_1$ through $F_6$ are then matrixed by an adjustable apparatus having a multiplicity of different conditions of adjustment and which must be established by the subscriber in a different predetermined condition of adjustment for each subscription program before the television signal for that program may be intelligibly reproduced. It corresponds in function to the transmitter switching apparatus referred to above and in each condition of adjustment establishes a different interconnection or permutation of the six rectified bursts resulting in four or five different signal components. All but two of the components are used for decoding while the other two components are used for correlation and deenergizing the subscriber's decoder upon the completion of the program being watched. The components used for decoding purposes are also utilized by the present invention for accomplishing real time remote use metering and also remote disabling of the decoder.

This then, is a brief description of the type of system in which the present invention may be used. A more thorough explanation, however, may be found in the aforementioned Morris U.S. Pat. No. 3,344,806.

Referring now to FIG. 1. transmitter 1 associated with central office 2 and of the type previously described broadcasts via antenna 3 to all receivers in the system a composite video signal which is varied between different conditions from time to time in accordance with a predetermined code schedule concurrently with a composite code signal having a plurality of components whose permutation varies in relation to the code schedule. For each composite video signal condition there are a multiplicity of available code signal component permutations. As previously described, the components of the code signal permutations occur during each vertical retrace interval of the composite video signal. In practicing the present invention the code signal component permutation transmitted by transmitter 1 during each vertical retrace interval preferably comprises 10 digits having one of four components in each digit. For the purposes of this discussion the four components will be designated as A's, B's, C's and E's. Each digit falls inbetween successive horizontal pulses during the vertical-retrace interval. The first 10 of the last 11 spaced between horizontal pulses during the vertical-retrace interval are used for the permutation code signal.

The composite video signal and composite code signal transmitted by transmitter 1 are received by each of a plurality of receivers located in a given geographical area such as areas I and II graphically represented in FIG. 1. Associated with each receiver is a decoder which responds to the composite code signal to decode the composite video signal so that an intelligible video signal may be displayed. Each decoder is connected in common with common return link 4 which connects all of the decoders within a given geographical area in common with the central office. Each decoder comprises a permutation device responsive to a different permutation of the code signal component to develop a predetermined response which is returned to the transmitter on the common return link.

Figure 2:
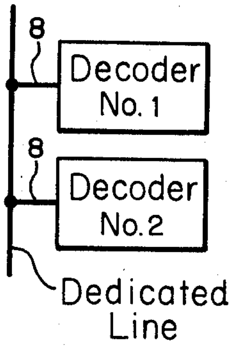
FIG. 2 is a block diagram showing how the pay TV decoders are commonly connected to the common return link.

Transmitter 1 includes means, preferably a computer 6 in central use recording office 2 being controlled by a suitable program, causing it to send different ones of a multiplicity of code signal component permutations upon different recurrences of a given composite video signal code condition so that response signals are sequentially developed by those of the decoder permutation devices which are in current use. Coupling means 8 (FIG. 2) couples each decoder to the common return link, which may be any type of communications link but most conveniently may be constituted by a wire line return link including a dedicated telephone line, so that the response signal of those decoders in current use may be returned to the central office in time sequence correlated with that of the different code signal component permutation sent by the transmitter.

Figures 3, 3A:
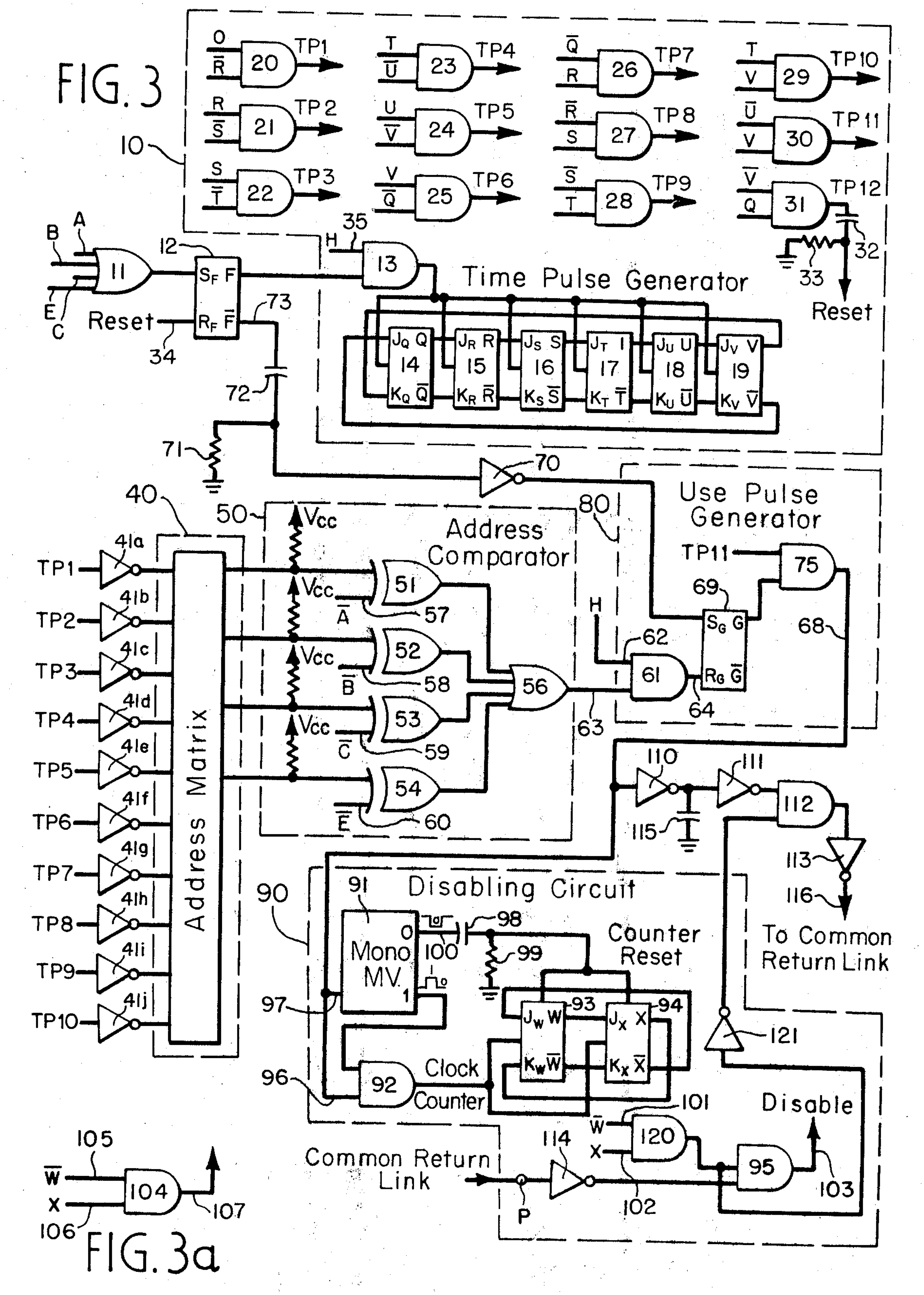
FIG. 3 is a schematic circuit diagram of a preferred form of decoder for use in the system of FIGS. 1 and 2.
FIG. 3*a* is a schematic diagram of a circuit modification for an alternate mode of disabling operation.

A circuit diagram of the permutation device incorporated in each decoder in a preferred embodiment of the invention is shown in FIG. 3. The permutation device comprises a time pulse generator 10, an address matrix 40, an address comparator 50, and a use pulse generator 80. Very briefly, the permutation device locally generates a permutation code signal different from those generated by all other receivers, and compares the locally generated permutation code signal with the one received over the air and responds in a predetermined manner when the broadcast permutation code signal and the locally generated permutation code signal represent the same code signal permutation.

Time pulse generator 10 and address matrix 40 generate the decoder-identifying code signal permutation in the following manner.

Figure 5:
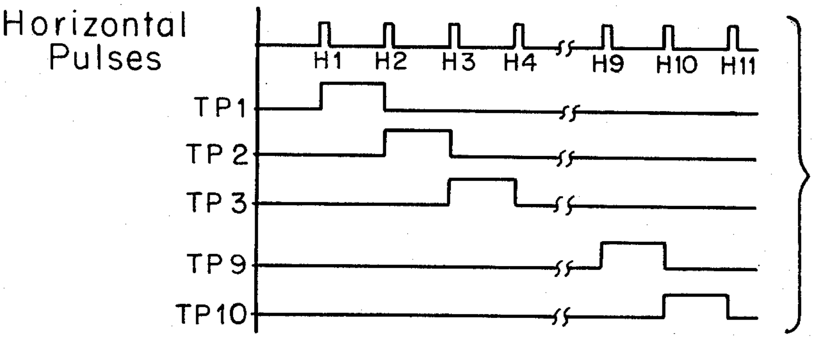
FIG. 5 is a graphical representation of signal wave forms which are helpful in understanding the operation of the preferred embodiment as diagrammed in FIG. 3.

The first component of the received permutation code enables OR gate 11 which sets RS flip-flop 12 which in turn enables AND gate 13 to translate horizontal pulses H impressed on input 35 to time pulse generator 10. Time pulse generator 10 comprises JK flip-flops 14–19 and is of a configuration well known in the art. Time pulse generator 10 in conjunction with AND gates 20–31 produce sequential rectangularly shaped time pulses at the respective outputs of gates 20–31 in time synchronism with successive horizontal pulses. This may be more clearly understood with reference to FIG. 5. The first time pulse TP1 occurs at the output of gate 20 (FIG. 3) in response to the first horizontal pulse H1 and begins at the leading edge of H1 and ends at the leading edge of H2. Also at the leading edge of H2, time pulse TP2 occurs at the output of gate 21 (FIG. 3) and continues until the leading edge of H3 when pulse TP3 is produced at the output of gate 23 and ends at horizontal pulse H4. The generation of these timing pulses continues until twelve sequential timing pulses are generated by AND gates 20–31 respectively.

The outputs of gates 20–29, designated TP1 through TP10 respectively, are connected to the inputs of inverters 41A–41J of address matrix 40 as shown. Address matrix 40 determines the code signal permutation generated by the receiver which in turn determines which received code signal permutation the permutation device is responsive to. Each output of the 10 inverters 41A–41J is hard wired to one of the inputs of four exclusive OR gates 51–54 of address comparator 50. This permutes the time pulses generated by time pulse generator 10 in accordance with a specific code signal permutation which is unique for each subscriber's decoder. The timing pulses are inverted by inverters 41 so that they may be combined by tying the inverter outputs together. This is of course only one of the many ways by which the time pulses may be combined. As is well known in the art, by providing load resistors 55A–55D at the inputs of exclusive OR gates 51–54 the inverters will see just one output load impedance represented by the impedance of resistors 55.

The code signal permutation generated by time pulse generator 10 and address matrix 40 is compared to the received code signal component permutation by address comparator 50. The address comparator 50 comprises exclusive OR gates 51 through 54 and a four-input OR gate 56. As explained earlier, the received code signal permutation components are rectified and filtered by appropriate filtering circuitry in the receiver. Each of the received components is inverted and connected to the alternate inputs of exclusive OR gates 51–54. More specifically, the inverted A component designated $\bar{A}$ is connected to input 57 of exclusive OR gate 51, the inverted B component $\bar{B}$ is connected to input 58 of exclusive OR gate 52, the inverted C component $\bar{C}$ is connected to input 59 of exclusive OR gate 53, and the inverted E component $\bar{E}$ is connected to input 60 of exclusive OR gate 54.

Use pulse generator 80 of a given decoder responds in a predetermined manner when the received component permutation signal corresponds with the permutation assigned to that particular decoder. Capacitor 72 and resistor 71 differentiate the transition at terminal 73 of RS flip-flop 12 when RS flip-flop 12 is set by gate 11. This differentiated transition is then inverted by inverter 70 and sets RS flip-flop 69 which in turn enables AND gate 75 to translate time pulse TP11 to output 68 to provide the predetermined response upon address recognition. If during the address comparison, two respective signal components do not correlate, the address comparator provides an output which will trigger RS flip-flop 69 to inhibit gate 75 and thus to preclude the predetermined response from being generated. If each of the 10 individual comparisons do correlate however, address comparator 50 will not inhibit the use pulse generator.

Figure 4:
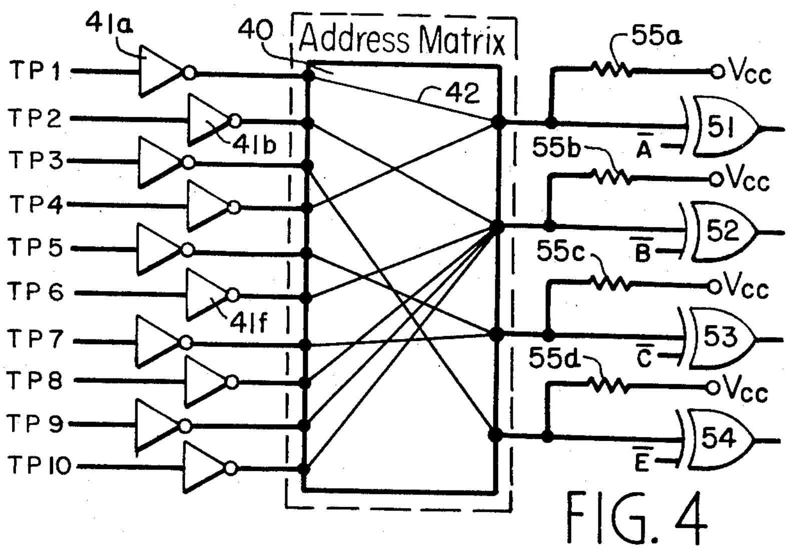
FIG. 4 is a partly schematic and partly graphical representation of an address matrix which determines the permutation of the code signal components to which an individual decoder is responsive.

As an example, note that in FIG. 4 time pulse TP1 is hard wired by conductor 42 to one of the two inputs of exclusive OR gate 51. This corresponds to a signal component permutation whose first component is an A. If the first component of the received permutation is also an A, each pair of inputs to the exclusive OR gates 51 through 54 will see the same input signal. As is well known in the art, an exclusive OR gate will provide an output of a logical 0 if all of its inputs see the same input signal level. Therefore, in this case, when there is coincidence between the received and the locally generated code components each of the exclusive OR gates 51–54 will provide a logical 0 output. Each output of exclusive OR gates 51–54 is connected to an input to OR gate 56. OR gate 56 as can be understood by one skilled in the art, will provide a logical 0 at output 63 under these input conditions. This inhibits AND gate 61 from triggering RS flip-flop 69 and in turn does not upset the enabling of AND gate 75. If this continues for each of the comparisons of the 10 digits, gate 75 will be allowed to translate timing pulse TP11 to output 68 to provide the predetermined response.

On the other hand, if the first component received represents a B, then exclusive OR gates 51 and 52 will have different signal levels at their inputs to provide a logical 1 at their outputs, allowing output 63 of OR gate 56 to attain the logical 1 state. This in turn enables gate 61 to translate the horizontal pulse at input 62 to its output 64 which triggers flip-flop 69 to inhibit the use pulse generator gate 75 precluding the predetermined response from being generated.

The use pulse translated through AND gate 75 is fed through inverter 110, inverter 111, AND gate 112 and inverter 113. The output 116 of inverter 113 is connected to the common return link at P to return the use pulse to the central office to be recorded by computer 6.

Each receiver in the remote use metering system is provided with a different address matrix. Thus, each receiver generates a permutation code signal different from the permutation code signals generated by all other receivers. Each receiver compares the permutation code signal sent by the transmitter with the one generated by its own permutation device. Only the receiver having the address matrix which provides the locally generated permutation code signal corresponding to the permutation code signal sent by the transmitter will respond in the predetermined manner. Moreover, this comparison takes place during each vertical retrace interval, and the permutation device of the receiver responds in real time before the next succeeding vertical retrace interval.

After each vertical retrace interval, timing pulse TP12 produced by gate 31 is differentiated by capacitor 32 and resistor 33 and is used to reset RS flip-flop 12 at input 34. This makes each permutation device ready to respond to another series of signal components during the next vertical retrace interval.

The system also includes provision for remote disabling of selected decoders, and to this end each decoder is provided with a disabling circuit as shown in FIG. 3. As a preferred embodiment, disabling circuit 90 comprises a monostable multivibrator 91, an AND gate 92, a pair of JK flip-flops 93 and 94, AND gate 95, AND gate 120 and inverter 114.

Briefly, the disabling circuit disables the selected decoder upon the establishment of two operation conditions. One condition is established by the predetermined response from the permutation device. The second condition is established in the common return link by a central office operation. Each decoder is provided with self-disabling means responsive to the establishment of the first and second predetermined conditions.

AND gate 92 and JK flip-flops 93 and 94 are wired in a clock counter configuration well known in the art. As represented in FIG. 3, the clock counter counts three successive use pulse responses from use pulse generator 80. The output pulses from use pulse generator 80 are impressed on input 96 of gate 92. Monostable multivibrator 91 is set by the first use pulse received at input 97 to enable AND gate 92 and is preset to maintain itself in its unstable state for slightly more than three field-trace intervals. Monostable multivibrator 91 then resets the counter with a differentiated pulse produced by capacitor 98 and resistor 99 connected to output 100.

Outputs $\overline{W}$ and X from the counter are applied to terminals 101 and 102 respectively of AND gate 120, and as is well known in the art, both $\overline{W}$ and X represent a logical 1 concurrently when three predetermined responses have been counted. This establishes the first predetermined condition in response to the response signals from the permutation device. A logical zero established in common return link 4 by an operation at the central office is subsequently inverted by inverter 114 to establish the second predetermined condition. This is preferably accomplished as shown in FIG. 1 by grounding the common return link 4 at the central office by closing switch 5. Upon the establishment of the first and second predetermined conditions, AND gate 95 will be enabled to provide a predetermined response at output 103 to disable the decoder.

As mentioned earlier, a central transmitter may serve more than one geographical area. Each decoder in any given geographical area generates a permutation code different from all other decoders in that area, and the permutation code assignments are duplicated in the second area to expand system capacity. To assure that only the selected decoder is disabled, the second predetermined condition is established only on the return link connected to the geographical area in which the selected decoder is located. Also, to assure that use pulses from generator 80 cannot themselves disable the decoder, or a decoder in another area responsive to the same code signal permutation as the decoder to be disabled, each decoder has protective circuitry comprising an inverter 110, a capacitor 115, an inverter 111, an AND gate 112, an inverter 113, and an inverter 121. After the disabling circuit counter has counted three successive use pulses establishing the logical one state at inputs 101 and 102 of AND gate 120, inverter 121 after sensing this will inhibit AND gate 112. Capacitor 115 delays the use pulses out of AND gate 75 and inverter 110 so that the third successive use pulse will not be placed onto the common return link to accidentally enable AND gate 95 to disable the decoder or one in another area having a duplicated code assignment which should not be disabled. Also, inverter 110, inverter 111, AND gate 112, and inverter 113 isolate the use pulses on the common return link from each decoder's counter so that each counter will respond only to its own permutation device.

The establishment of the second predetermined condition in the common return link may be made in response to the use pulse provided by the decoder to be disabled to assure the central transmitter that the particular decoder to be disabled is in current use. If the particular decoder is not in current use, computer 6 after not recording a use pulse from the particular decoder, will cause the transmitter to cease sending the permutation code corresponding to the permutation code generated by the particular decoder. This is accomplished with inverter 150, RS flip-flop 151, AND gate 152, OR gate 153, RS flip-flop 154, capacitor 155, resistor 156, and inverter 157 of FIG. 1. Before the transmitter 1 broadcasts the permutation code of the selected decoder to be disabled, computer 6 produces a pulse to set RS flip-flop 151 and 154. If the selected decoder is not in current use, computer 6 immediately after the code signal is sent will provide AND gate 152 with a pulse to enable AND gate 152 to enable OR gate 153 to reset RS flip-flop 154 which then creates a transition which is differentated by capacitor 155 and resistor 156 and propagated through inverter 157 to cause the computer 6 to index to the next code signal permutation to be sent causing the transmitter to cease sending the permutation code corresponding to the permutation code to which the selected decoder is responsive. If, however, the selected decoder is in current use, the use pulse on common return link 4 returned through inverter 150 will reset RS flip-flop 151 to inhibit AND gate 152. After the code signal permutation of the selected decoder has been sent a sufficient number of times, in this embodiment 3 times, computer 6 enables OR gate 153 to reset RS flip-flop 154 which then causes the computer to index to the next code signal permutation to be sent. This feature allows the remote use metering system to conserve valuable use metering time.

If it is desired not to take advantage of this feature, however, the second predetermined condition may be established in the common return link at any time so long as it is established so that it is coincident with the establishment in the logical state of $\overline{W}$ and X. Of course, with proper circuit modifications, the present invention may also be practiced on a sequential basis.

Figure 6:
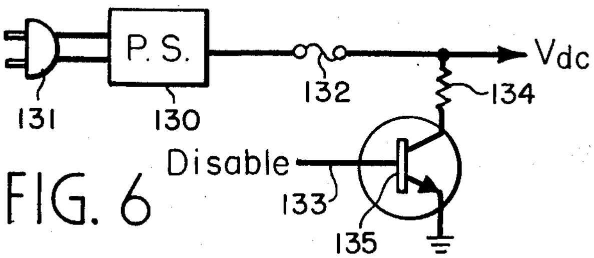
FIG. 6 is a schematic circuit diagram of a preferred disabling means for use with the circuit of FIG. 3.

The disabling pulse from output 103 of gate 95 is impressed upon the basis 133 of transistor 135 of the disabling means as shown in FIG. 6. Power supply 130 is connected to a conventional AC source via plug 131 and supplies a constant DC voltage to be utilized as the operating voltage for the decoder. In series with the output of the power supply is a fuse 132 which has a predetermined maximum current rating, for example 1.5 amperes. Resistor 134 in series with the collector of transistor 135 shunts the output of the power supply at fuse 132. The disabling pulse from output 103 of AND gate 95 forward biases the base 133 of transistor 135, causing transistor 135 to conduct current and thus shorting the output of the power supply to ground causing fuse 132 to be destroyed. This shuts off the operating voltage for the decoder and consequently disables the decoder. Fuse 132 is preferably mounted within a locked cabinet for the decoder so that it may only be replaced by a service call.

This preferred embodiment, therefore, enables remote disabling of a selected decoder while providing protective circuitry so that other decoders are not placed in jeopardy of being disabled. Any decoder in the system may be selectively disabled if the second condition is established in the common return link and the code signal component permutation corresponding to the signal component permutation generated by the selected decoder to be disabled is broadcast three times during successive vertical retrace intervals when the selected decoder is in use.

The purpose of the monostable multivibrator 91 is to reset the disabling-circuit counter, and its duty cycle may be preset to accommodate or require other numbers of use signals to establish the first of the two required concurrent conditions for disablement. If more than three use pulses are to be counted for disablement, any clock counter well known in the art which establishes a predetermined condition upon the current number of use pulses being counted, may be used to practice the present invention.

An alternative approach to remote disabling in accordance with the present invention, and as a still further preferred embodiment of the present invention is represented in FIG. 3A. In FIG. 3A is shown a simple two-input AND gate 104 which may be directly coupled to outputs $\overline{W}$ and X at its inputs 105 and 106 respectively. This alternative approach makes it possible to disable a selected decoder without the use of a common return link. Therefore, the protective circuitry comprising inverter 110, capacitor 115, inverter 111, AND gate 112, inverter 113, inverter 121, AND gate 120 and AND gate 95 are no longer necessary. When the transmitter has broadcast the code signal permutation of the selected decoder to be deenergized a given number of times, in this preferred embodiment 3 times, during successive vertical retrace intervals, $\overline{W}$ and X in response to the counter will concurrently acquire the logical state of 1 at inputs of 105 and 106 respectively developing a predetermined control effect to enable gate 104 to disable the receiver. Output 107 of AND gate 104 will then provide a disabling pulse to be utilized by the disabling means of FIG. 6. Therefore, to disable a selected decoder in accordance with this embodiment, it is only necessary to send the permutation code signal corresponding to the selected decoder to be disabled repetitively a given number of times.

To practice this embodiment, it is necessary that each decoder being served by the same central transmitter be assigned a unique permutation code, to assure that only the selected decoder will be disabled.

Thus the present invention makes it possible to determine from the transmitter or other central station which decoders are in use to receive individual subscription telecasts, and also, if desired, to disable selected receivers from the remote central station. Disabling can be accomplished in such a way that the decoder can be reactivated by a simple service call but not by a subscriber operation. Both the remote use metering and the remote disabling function can be accomplished reliably and with modest additional central station equipment requirements, and the one additional circuitry required at the decoders can be supplied at low cost by employing standard logic circuit modules in either integrated-circuit or discrete-component form.

While a particular embodiment of the invention has been shown and described, it will be obvious to those skilled in the art that changes and modifications may be made without departing from the invention in its broader aspects and, therefore, the aim in the appended claims is to cover all such changes and modifications as fall within the true spirit and scope of the invention.

We claim:

1. In an over-the-air pay TV system of the type in which a characteristic of the composite video signal is varied between different conditions from time to time in accordance with a predetermined code schedule and in which a composite code signal having a plurality of components whose permutation varies in relation to said code schedule is broadcast from a transmitter associated with a central office to all receivers in the system concurrently with the coded composite video signal, and in which there are a multiplicity of code signal component permutations for each composite video signal condition, a system for providing real time remote use metering of said receivers comprising:

a plurality of decoders, one associated with each receiver, for responding to said composite code signal to decode said coded composite video signal, each of said decoders comprising a permutation device responsive to a different permutation of said code signal components to develop a predetermined response signal;

a common return link from all of said receivers to said central office;

means causing said transmitter to send different ones of said multiplicity of code signal component permutations upon different recurrences of a given composite video signal code condition, whereby response signals are sequentially developed by those of said decoder permutation devices which are in current use;

and means coupling all of said decoder permutation devices to said common return link to return to said central office response signals from all operating decoders in time sequence correlated with that of the different code signal component permutations sent by said transmitter.

2. A system in accordance with claim 1 where said common return link is a wire-line-return link.

3. A system in accordance with claim 2 where said wire-line-return link comprises a dedicated telephone line.

4. A system in accordance with claim 1, which further comprises an additional plurality of receivers all coupled to said central office by an additional common return link, and each such additional receiver comprising a decoder having a permutation device responsive to the same permutation of said code signal components as one of the decoders associated with the receivers coupled to the first common return link.

5. In an over-the-air pay TV system of the type in which a characteristic of the composite video signal is varied from time to time in accordance with a predetermined code schedule and in which a composite code signal having a plurality of components whose permutation varies in relation to said code schedule is broadcast from a transmitter associated with a central office to all receivers in the system concurrently with the composite video signal, and in which there are a multiplicity of code signal permutations of each composite video signal condition, and in which there is a decoder associated with each said receiver which responds to said composite code signal to decode said coded composite video signal, a system for remotely disabling a selected decoder comprising:

a plurality of permutation devices, one associated with each decoder, and each responsive to a different permutation of said code signal components to develop a predetermined response signal;

means causing said transmitter to send the code signal component permutation corresponding to the permutation device of said selected decoder to be disabled, whereby response signals are developed by such permutation device;

means coupled to each permutation device for responding to said response signals from said permutation device in a predetermined manner to establish a first predetermined condition;

a common return link from all of said decoders to said central office;

means coupling all of said decoder permutation devices to said common return link;

means at said central office for establishing a second predetermined condition in said common return link;

and disabling means associated with each decoder and coupled to said common return link and responsive to establishment of said first and second predetermined conditions for disabling said decoder.

6. A system in accordance with claim 5 where said disabling means is located within a locked enclosure.

7. A system in accordance with claim 5 where said disabling means comprises a fuse.

8. A system in accordance with claim 5 where said system comprises means for establishing said second predetermined condition in response to a response signal from the decoder to be disabled.

9. A system in accordance with claim 5 where said system comprises means causing said transmitter to cease sending the permutation code corresponding to the permutation code to which said selected decoder is responsive upon recognition that said decoder is not in current use.

10. A system in accordance with claim 5 where said means coupled to each said permutation device for responding to said response signals from said permutation device in a predetermined manner to establish a first predetermined condition is isolated from all other permutation devices.

11. A system in accordance with claim 10 where said isolating means comprises the series connection of three inverters and an AND gate.

12. In an over-the-air pay TV receiver of the type that receives composite video signals having a characteristic varied between different conditions from time to time in accordance with a predetermined code schedule and a composite code signal having a plurality of components whose permutation varies in relation to said code schedule where there are a multiplicity of code signal component permutations for each composite video signal condition and which decodes said coded composite video signal, means to enable real time remote use metering comprising:

means for receiving said composite code signal;

means for generating a permutation code signal;

means for comparing said received composite code signal with said generated code signal;

and means for providing a predetermined response when said received code signal and said generated code signal represent the same code signal permutation.

13. An over-the-air pay TV receiver in accordance with claim 12 where said means for generating said permutation code signal comprises:

means for generating successive rectangularly shaped pulses;

means coupled to said generating means for combining certain ones of said pulses;

and means coupled to said combining means for permuting said combined pulses.

14. An over-the-air pay TV receiver in accordance with claim 12 where said means for comparing said received composite code signal with said generated code signal comprises:

a two-input exclusive OR gate for each component of the code signal permutator;

means coupling each received component to alternate inputs of said exclusive OR gates;

means coupling said generated permutation code signal components to the unoccupied inputs corresponding to said received components;

a four-input OR gate;

and means coupling each exclusive OR gate to one of said OR gate inputs.

15. An over-the-air pay TV receiver of the type which receives composite video signals having a characteristic varied between different conditions from time to time in accordance with a predetermined code schedule and a composite code signal having a plurality of components whose permutation varies in relation to said code schedule where there are a multiplicity of code signal component permutations for each composite video signal condition, and in which decodes said coded composite video signal, means to enable remote disabling of said receiver comprising:

means for receiving said composite code signal;

means for generating a permutation code signal;

means for comparing said received composite code signal with said generated code signal;

means for providing a predetermined response when said received code signal and said generated code signal represent the same code signal permutation to establish a first predetermined condition;

means for establishing a second predetermined condition;

and disabling means responsive to establishment of said first and second predetermined conditions for disabling said receiver.

16. An over-the-air pay TV receiver in accordance with claim 15 where said means for providing a predetermined response to establish a first predetermined condition comprises means for establishing said first condition upon predetermined plurality of said predetermined responses.

17. A system in accordance with claim 15 which further comprises a means for preventing said response signals from said decoder to be disabled from disabling a decoder not to be disabled comprising:

means at said decoder to be disabled for delaying said response signals;

means at said decoder to be disabled for sensing the establishment of the first said predetermined condition;

and means at said decoder for inhibiting said response signals from said common return link.

18. A method of real time remote use metering for an over-the-air pay TV system of the type in which a characteristic of the composite video signal is varied between different conditions from time to time in accordance with a predetermined code schedule and in which a composite code signal having a plurality of components whose permutation varies in relation to said code schedule is broadcast from a transmitter associated with a central office to all receivers in the system concurrently with the coded composite video signals and in which there are a multiplicity of code signal component permutations for each composite video signal condition, which method comprises:

broadcasting different ones of said multiplicity of code signal component permutations upon different recurrences of a given composite video signal code condition;

generating at each operating receiver a code signal component permutation different from those generated by all other receivers;

receiving at each operating receiver the broadcast code signal component permutations and comparing the received permutations with the signal component permutation generated by such receiver;

developing a response signal at each operating receiver upon correlation of a received code signal permutation with the permutation generated at such receiver, and returning to said central office the response signals developed by all operating decoders in time sequence correlated with that of the different code signal component permutations sent by said transmitter.

19. A method of remotely disabling a selected receiver in an over-the-air pay TV system of the type in which a characteristic of the composite video signal is varied between different conditions from time to time in accordance with a predetermined code schedule and in which a composite code signal having a plurality of components whose permutation varies in relation to said code schedule is broadcast from a transmitter associated with a central office to all receivers in the system concurrently with the coded composite video signals, and in which all said receivers are linked in common with said transmitter, which method comprises:

generating at each operating receiver a signal component permutation different from those generated by all other receivers;

broadcasting the code signal component permutation corresponding to the signal component permutation generated by said selected receiver to be disabled;

receiving at each operating receiver the broadcast code signal component permutation and comparing the received permutation with the signal component permutation generated by such receiver;

developing a predetermined response signal at said selected receiver upon correlation of the received code signal permutation with the permutation generated at said selected receiver to establish a first predetermined condition;

establishing at said central office a second predetermined condition in said common link;

and disabling said selected receiver in response to the establishment of the first and second predetermined conditions.

20. In an over-the-air pay TV system of the type in which a characteristic of the composite video signal is varied from time to time in accordance with a predetermined code schedule and in which a composite code signal having a plurality of components whose permutation varies in relation to said code schedule, is broadcast from a transmitter associated with a central office to all receivers in the system concurrently with the composite video signal, and in which there are a multiplicity of code signal permutations for each composite video signal condition, and in which there is a decoder associated with each said receiver which responds to said composite code signal to decode said coded composite video signal, a system for remotely disabling a selected decoder comprising:

a plurality of permutation devices, one associated with each decoder, and each responsive to a different permutation of said code signal component to develop a predetermined response signal;

means causing said transmitter to repetitively send the code signal component permutation corresponding to the permutation device of said selected decoder to be disabled at times when said system is operating with a given composite video signal code condition whereby response signals are developed by said permutation device;

means coupled to each permutation device for counting such response signals therefrom and for developing a predetermined control effect when a given number of said response signals have been counted;

and disabling means associated with each decoder and responsive to said control effect for disabling said decoder.

21. An over-the-air pay TV receiver of the type which receives composite video signals having a characteristic varied between different conditions from time to time in accordance with a predetermined code schedule and a composite code signal having a plurality of components whose permutation varies in relation to said code schedule where there are a multiplicity of code signal component permutations for each composite video signal condition and which has a means to enable remote disabling of said receiver comprising:

means for receiving said composite code signal;

means for generating a permutation code signal;

means for comparing said received composite code signal with said generated code signal and for providing a predetermined response when said received code signal and said generated code signal represent the same code signal permutation;

means for counting said predetermined responses and for developing a control effect upon registration of a predetermined count;

and disabling means responsive to said control effect for disabling said receiver.

22. An over-the-air pay TV receiver in accordance with claim 21 where said counting means comprises a monostable multivibrator for resetting said counting means.

23. An over-the-air pay TV receiver in accordance with claim 21 where said counting means comprises means for developing said control effect upon counting three predetermined responses.

24. A method of remotely disabling a selected receiver in an over-the-air pay TV system of the type in which a characteristic of the composite video signal is varied between different conditions from time to time in accordance with a predetermined code schedule and in which a composite code signal having a plurality of components whose permutation varies in relation to said code schedule is broadcast from a transmitter associated with a central office to all receivers in the system concurrently with the coded composite video signals, which method comprises:

generating at each operating receiver a signal component permutation different from those generated by all other receivers;

broadcasting repetitively the code signal component permutation corresponding to the signal component permutation generated by said selected receiver to be disabled at times when said system is operating with a given composite video signal code condition;

receiving at each operating receiver a broadcast code signal component permutation and comparing the received permutation with the signal component permutation generated by such receiver;

developing a predetermined response signal at said selected receiver upon correlation of the received code signal permutation with the permutation generated at said selected receiver;

and disabling said receiver when a given number of predetermined responses have been counted.

* * * * *